Figure 1:
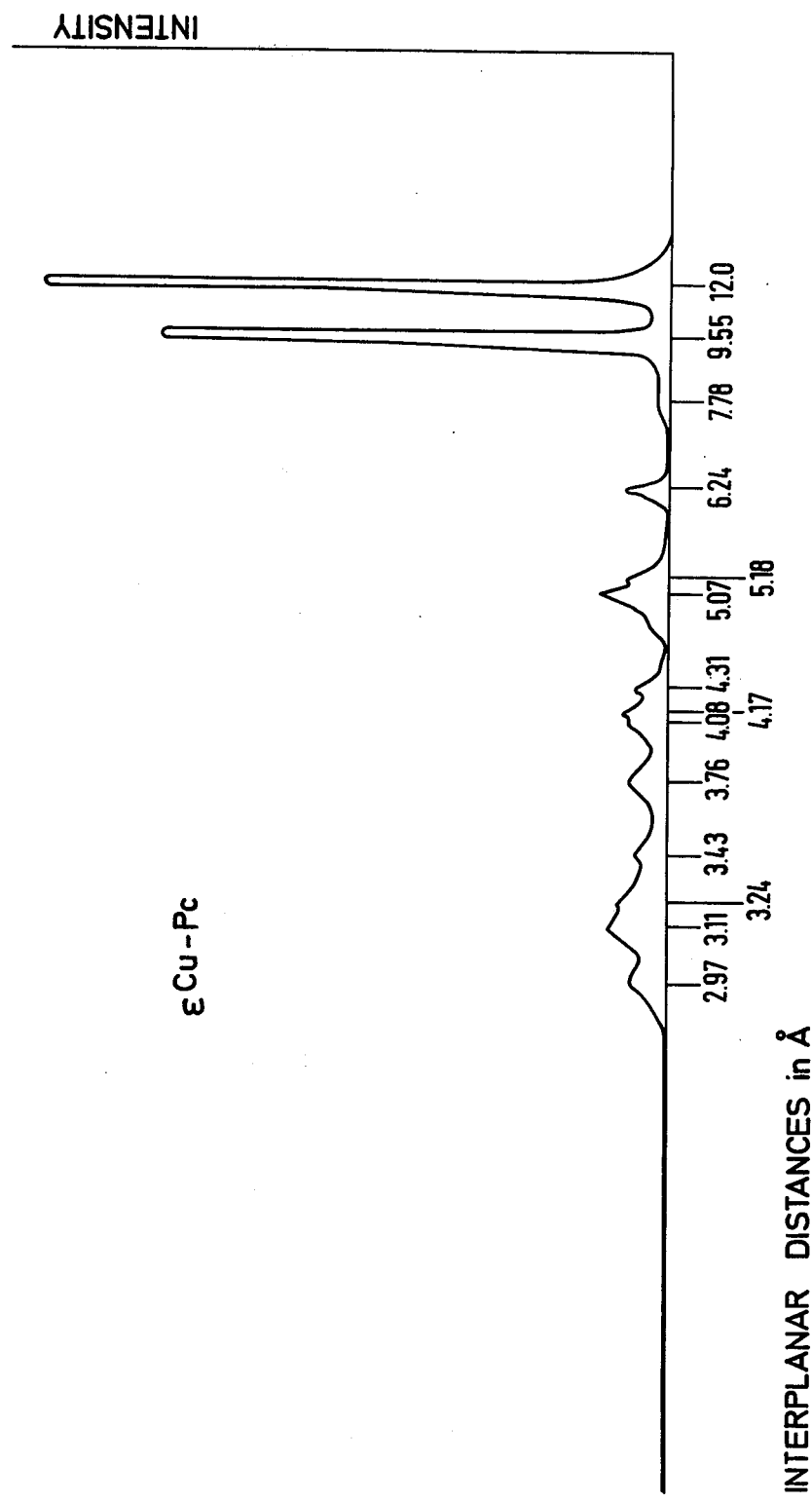

United States Patent [19]

Wheeler

[11] 4,135,944
[45] Jan. 23, 1979

[54] PIGMENT COMPOSITION

[75] Inventor: Ian R. Wheeler, Houston, Scotland

[73] Assignee: Ciba-Geigy Corporation, Ardsley, N.Y.

[21] Appl. No.: 835,072

[22] Filed: Sep. 20, 1977

[30] Foreign Application Priority Data

Sep. 21, 1976 [GB] United Kingdom ............... 38983/76
Feb. 25, 1977 [GB] United Kingdom ................ 8079/77

[51] Int. Cl.² .............................................. C08K 5/34
[52] U.S. Cl. ........................... 106/288 Q; 106/308 N; 106/308 S; 260/314.5
[58] Field of Search ........... 106/288 Q, 308 N, 308 S; 260/314.5

[56] References Cited

U.S. PATENT DOCUMENTS 3,891,455 6/1975 Langley et al. ................. 106/308 N
4,055,440 10/1977 Wheeler et al. ................ 106/288 Q

FOREIGN PATENT DOCUMENTS 1263684 2/1972 United Kingdom.

Primary Examiner—Winston A. Douglas
Assistant Examiner—Jacqueline V. Howard
Attorney, Agent, or Firm—Vincent J. Cavalieri; Michael W. Glynn

[57] ABSTRACT

A single stage process for the production of copper phthalocyanine pigment compositions having x-ray diffraction spectra corresponding to the form of pure, or substantially pure ε-crystal modification of copper phthalocyanine comprising reacting, at an elevated temperature and in an organic solvent, an organic compound capable of forming the phthalocyanine ring system, a copper compound capable of providing the copper atom of the phthalocyanine molecule, a reaction catalyst, and a nitrogen source, in the presence of, as crystal form modifier, a compound of the formula:

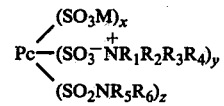

where Pc represents a copper phthalocyanine residue, $R_1$, $R_2$, $R_3$, $R_4$, $R_5$ and $R_6$ are the same or different and each is a hydrogen atom, an alkyl group, a cycloalkyl group, an aryl, aralkyl, alkaryl, cycloalkaryl or dehydroabietyl group, the alkyl and cycloalkyl groups being optionally unsaturated and/or interrupted by heteroatoms, M represents hydrogen or an alkali metal atom and x, y and z are each in the range of from 0 to 4 with the proviso that the sum of x, y and z is within the range of from 1 to 4. Very red shade copper phthalocyanine pigment compositions of the advantageous ε-modification can be produced in a single stage without the use of high shear forces.

12 Claims, 6 Drawing Figures

εCu-Pc EXAMPLE 3

ε Cu-Pc EXAMPLE 9

PIGMENT COMPOSITION

The present invention relates to a single stage process for the synthesis of copper phthalocyanine pigments having a very red shade and having x-ray diffraction spectra corresponding to the form of the ε-modification of copper phthalocyanine.

There are five known crystal modifications of copper phthalocyanine, namely the α-, β-, γ-, δ-, and ε- modifications. A modification termed the "R-form" has also been described but is, in fact, identical to the ε-form. The particular crystal modification in which copper phthalocyanine is produced is of great commercial significance because each modification differs greatly from the others in its properties, both physical and tinctorial. In relation to tinctorial properties, α-copper phthalocyanine exhibits red-shade blue pigmentations in surface coating binders; whereas the other commonly used copper phthalocyanine, the β modification, exhibits green-shade blue pigmentations in such substrates. The γ- and δ- modifications exhibit shades falling between the extremes shown by the α- and β-modifications.

Pure ε-modification copper phthalocyanine exhibits the shade which is the reddest of all the known copper phthalocyanine modifications. Thus the pure ε-modification is markedly redder than any of the α-, γ- or δ-modifications, whether considered individually or as mixtures derived from the α-, γ- or δ- modifications or even as mixtures of the latter modifications with the ε-modification.

In addition to their desirable shade, pigments having the pure ε-modification are advantageous in that they are resistant to conversion into the β-modification of copper phthalocyanine which is the most stable modification. Pigments of the ε-modification can also be more transparent that those of the α- or β-modifications, making them attractive in inks and paints especially metallic automotive finishes, wherein they display a marked "flip-tone".

U.S. Pat. No. 3,051,721, describes a method of producing the "R-form", or ε-modification of copper phthalocyanine. In this process, the copper phthalocyanine is prepared from phthalonitrile and copper salts in a urea melt in a kneader employing forces of high shear.

This process has many disadvantages. Firstly, the use of a kneader is cumbersome and expensive. Furthermore, it is very difficult to control the spontaneous exothermic reaction occurring between the phthalonitrile and the copper salts. Consequently, it is difficult to ensure that no decomposition of copper phthalocyanine takes place in the reaction mixture. It is evident from U.S. Pat. No. 3,051,721 that the α- rather than the ε-modification is produced if the specific reaction conditions are not followed exactly.

In German Pat. No. 1,181,248, concerned with printing inks containing a copper phthalocyanine of the ε-modification, a further method for producing the ε-modification is described. The method is however very complex and results only in mixtures of the ε-modification with α-, β- and δ- modifications.

The presence of β-modification in these mixtures renders them unstable to solvents because the conversion of the other modifications into the stable β-form in the presence of solvents such as aromatic hydrocarbons is accelerated by the presence of the β-form.

A process for the preparation of copper phthalocyanine of pure or substantially pure ε-form is described and claimed in BP No. 1,411,880, whereby the α-, β- and/or δ-modifications of copper phthalocyanine are converted to an α-/ε-modification mixture by grinding in a ball mill for an extended period, and subsequently treating with a liquid, especially a low molecular weight oxygen containing organic solvent to effect conversion of α-/ε-mixture to substantially pure ε-modification. A disadvantage of the process is that the solvent treatment must be carried out at a controlled temperature, which is dependent on the solvent used, at which practically no conversion to the β-modification takes place. The presence of any β-modification is to be avoided as it appears to induce further formation of the β-form causing poor yields of the ε-form to be obtained, and provides pigments of poor solvent stability in application media.

It is a feature of these known methods of preparation of the ε-form of copper phthalocyanine that a high energy input is required to effect comminution and change of crystal modification. Indeed, in U.S. Pat. No. 3,051,721, it is stated that a high shear appears to be essential to the production of the R(ε) form. Furthermore, the methods of preparation so far described require several stages of treatment of a copper phthalocyanine preformed in one of its other crystal modifications. Such processes tend to be lengthy and costly to perform.

In contrast to the foregoing, we have found, surprisingly, that very red shade copper phthalocyanine pigment compositions which correspond, in their x-ray diffraction spectra, to the pure or substantially pure ε-form may be obtained by the addition of specific additives to the synthesis of copper phthalocyanine from its precursors, without the use of high shear forces.

Accordingly, the present invention provides a single stage process for the production of copper phthalocyanine pigment compositions having X-ray diffraction spectra corresponding to the form of pure, or substantially pure ε- crystal modification of copper phthalocyanine comprising reacting, at an elevated temperature and in an organic solvent, an organic compound capable of forming the phthalocyanine ring system, a copper compound capable of providing the copper atom of the phthalocyanine molecule, a reaction catalyst, and a nitrogen source, in the presence of, as crystal form modifier, a compound of the formula:

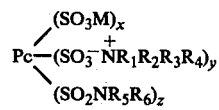

Wherein Pc represents a copper phthalocyanine residue, $R_1$, $R_2$, $R_3$, $R_4$, $R_5$ and $R_6$ are the same or different and each is a hydrogen atom, an alkyl group, a cycloalkyl group, an aryl, aralkyl, alkaryl, cycloalkaryl or dehydroabietyl group, the alkyl and cycloalkyl groups being optionally unsaturated and/or interrupted by heteroatoms, M represents hydrogen or an alkali metal atom and x, y and z are each in the range of from 0 to 4 with the proviso that the sum of x, y and z is within the range of from 1 to 4.

Preferred compounds of formula I are compounds of the formula

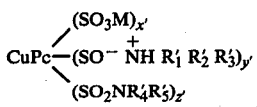
                                                        IA wherein CuPc represents a copper phthalocyanine residue, $R_1'$, $R_2'$, $R_3'$, $R_4'$ and $R_5'$ are the same or different and each represents a hydrogen atom, an acyclic alkyl group having from 1 to 22 carbon atoms or a cyclic alkyl group having from 5 to 22 carbon atoms, an aryl, aralkyl or especially dehydroabietyl group, M represents hydrogen or an alkali metal atom and x', y' and z' can each be 0 or a value in the range of from 1 to 4, with the provisos that the sum of x', y' and z' is within the range of from 1 to 4 and that the sum of x' and y' is not zero.

In relation to the compounds of formula I, the alkyl cycloalkyl, aryl, aralkyl or alkaryl groups $R_1$–$R_6$ may be interrupted by heteroatoms such as O, N and S, and may be substituted by hydroxyl, amino, or amide groups. In addition, when any of the groups $R_1$ to $R_6$ is aryl, said aryl group may optionally be substituted by halogen, especially chlorine, or nitro groups.

As a further aspect of this invention, there is provided a pigment composition having an X-ray spectrum corresponding to the ε-modification of copper phthalocyanine when produced by this process.

Salts of formula I are conveniently prepared by stirring together for a short time at pH5 an aqueous solution of a phthalocyanine sulphonic acid of formula

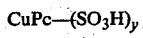

with a sufficient quantity of an aqueous solution of an amine of formula

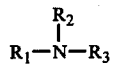

or a quaternary ammonium salt of formula

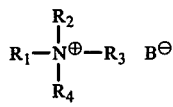

wherein $R_1$–$R_4$ are as previously designated and B⊖ is an anionic species such as halide, acetate or hydroxide. The compound of formula I so formed may be recovered by filtration, washing with warm water and drying at 50–60° C.

Amines or quaternay ammonium salts which are poorly soluble in water or aqueous acids may be reacted with phthalocyanine sulphonic acids in an oxygenated solvent such as isopropanol. The products may be recovered by dilution with water and removal of solvent by distillation.

Sulphonamides of formula I may be prepared by treatment of crude phthalocyanine by chlorosulphonic acid followed by thionyl chloride. The phthalocyanine sulphonyl chlorides so formed are subsequently totally reacted with a sufficient amount of an amine or mixture of amines in an aromatic solvent, such as toluene and in the presence of a weak base such as sodium carbonate.

Mixed sulphonic acid/sulphonamide compounds of formula I may be obtained by treatment of crude phthalocyanine with oleum or chlorosulphonic acid, optionally followed by thionyl chloride, to form a mixture of sulphonyl chloride and sulphonic acid which is subsequently reacted with an amine or mixture of amines.

Due to the methods of preparation of phthalocyanine sulphonamides and sulphonic acid salts by reaction of crude phthalocyanine with the aforementioned sulphonating agents, and subsequent treatment with an amine or mixture of amines, mixtures of compounds of formula I, having varying degrees of substitution are produced. Analysis of such mixtures therefore can establish fractional values for x, y and z. Preferred compounds of formula I are those wherein x has a value in the range 0–2 and z and y each have a value in the range 0–3, subject to the proviso described hereinbefore.

It is an advantage of the process of the present invention over those previously known that pigment compositions having X-ray spectra corresponding to the pure or substantially pure ε-modification of copper phthalocyanine may be obtained by a simple and inexpensive single stage synthetic process. Furthermore, in contrast to processes previously known, the process of the present invention gives rise to an ε-form copper phthalocyanine pigment composition essentially free of other crystal modifications, thereby providing a pigment of excellent stability to organic solvents, such as xylene and toluene, which are capable of converting the α-form of copper phthalocyanine to the β-form. Indeed, the pigment products of the invention are essentially unchanged in crystal size and modification by prolonged boiling in such solvents.

It is further advantage of the process of the present invention that the crystal modifying additive may be retained in the product in a condition whereby it appears to improve the rheological and colouristic properties of the pigment in application media in a similar manner to that described for α- and β-form copper phthalocyanine in the German Offenlegungsschrift No. 2,640,063 and in B.P. No. 1,263,684. Application properties may be improved in the various media by the use of crystal modifying additives most compatible with such media. Thus for solvent based paints and gravure inks, those compounds containing dehydroabietyl groups are preferred.

Moreover, whereas the product of a conventional copper phthalocyanine reaction mixture is in the form of non-pigmentary crystals having a particle size range of 40–100 microns, the products of the present invention surprisingly have particle sizes of less than 20μ, and in the case of certain additives, less than 1μ. Consequently, the products of the process either require no comminution or a short period of comminution, for example, in a ball mill, to achieve pigmentary, viz. sub-micron, size.

Copper phthalocyanine pigments of pure or substantially pure ε-modification of copper phthalocyanine may be differentiated from the other known modifications and from mixtures with these various modifications not only be shade but especially by means of X-ray diffraction spectra. The spectrum of the ε-form contained in FIG. 1 of the accompanying drawings is reproduced from German Pat. No. 1,181,248, in which the ε-form was described and claimed.

Further spectra shown herein are produced from the products of the invention prepared as described in the Examples.

Suitable organic compounds capable of forming the phthalocyanine ring system are, for example, phthalemic acid, phthalimide, phthalic acid, phthalic anhydride and o-cyano benzoic acid, though phthalic acid or annhydride are preferred.

Among copper salts capable of providing the central copper atom of the copper phthalocyanine molecule, there may be mentioned anhydrous cupric sulphate, anhydrous cupric acetate and anhydrous cuprous chloride but annhydrous cupric chloride is preferred. To ensure a high yield of the desired copper phthalocyanine, 0.9–1.10 moles of copper salt for every 4 moles of the phthalocyanine ring-forming compound should be used, although this ratio is not critical.

Urea is preferred as a source of nitrogen on account of its low cost and commercial availability. A satisfactory level of urea is 15–20 moles for every 4 moles of the phthalocyanine ring-forming compound.

Catalysts suitable for the operation of the process are those previously described in the literature as suitable for phthalocyanine synthesis. Compounds of molybdenum, especially ammonium molybdate or molybdic oxide are preferred as they have been found to give high yields of copper phthalocyanine. A concentration of 0.01–0.03 moles for every 4 moles of the phthalocyanine ring-forming compound is generally suitable.

Nitro-benzene is particularly preferred as the solvent.

Although the quantity of solvent employed in the reaction is not critical, it is usual to use only sufficient organic solvent to ensure a stirrable reaction mass; too much solvent is wasteful and tends to reduce the rate of reaction. A level of 2 to 10 moles per 4 moles of phthalocyanine ring-forming compound is generally found satisfactory.

A level of 1% – 20% w/w of the compound of formula I, based on copper phthalocyanine pigment, has been found satisfactory, though 5–15 w/w is preferred. Too low a level may give rise to appreciable quantities of undesirable crystal modifications, whilst too high a level is wasteful of additive and is moreover expensive.

The process of the invention may be carried out in any stirred vessel commonly employed for the preparation of phthalocyanines and capable of operation at temperatures from 25° to 220° C. It is found convenient to charge all reagents cold to the vessel. With stirring the temperature is raised cautiously through 100° C, whereat evolution of volatile material takes place, to 170–180° C. At such a temperature reaction is essentially complete in 6–10 hours, though the yield may be maximised by reacting for up to 18 hours. Alternatively, the reaction may be carried out at higher temperature for shorter times. A temperature of 200° C for 3½ hours has been found satisfactory, giving high yields of copper phthalocyanine. Although the crystal modifying additive is conveniently added at the start of the reaction, it may be added at any time during the heating stage at which the temperature of the reaction is less than 120° C.

The ε-form copper phthalocyanine product may be separated from the reaction mixture by any of the methods previously known; e.g. by filtration of the reaction mixture, washing the filter-cake with solvent e.g. methanol, and drying; by dilution by an oxygen-containing solvent such as methanol, filtering and washing with further methanol and drying; or by removal of the solvent by steam distillation under alkaline conditions followed by hot filtration and washibg with hot water. If desired, further by-products of the reaction may be removed, by stirring the presscake so obtained in hot aqueous mineral acid, filtering hot, washing with hot water and drying at 50–55° C.

The ε-form copper phthalocyanine pigments obtained according to the present invention may, if desired, be optimised in their applicational properties by conventional techniques. Such techniques include short milling cycles in a ball-mill, solvent treatment or the addition of rosin or an aliphatic amine having from 12 to 22 carbon atoms.

A still further aspect of the present invention concerns a composition comprising an organic material and a pigmenting proprotion of a pigment composition produced according to the present invention; and also a method of pigmenting organic material comprising incorporating therein a pigmenting proportion of a pigment composition produced according to the invention.

The proportion of the pigment composition in the organic material is normally within the range from 0.1 % to 35 % by weight, based on the weight of the organic material.

Organic materials which may be coloured according to the invention include high molecular weight organic material, e.g. cellulose ethers and cellulose esters such as ethyl cellulose, acetylcellulose and nitrocellulose; polyamides; polyurethanes; polyesters; natural and synthetic resins such as aminoplasts, especially urea-formaldehyde and melamine-formaldehyde resins; alkyd resins; phenoplasts, polycarbonates; polyolefins such as polystyrene, polyvinyl chloride, polyethylene or polypropylene; polyacrylonitrile; polyacrylic acid esters; rubber; casein; silicone and silicone resins; individually or in admixture. It does not matter whether these high molecular compounds are in the form of plastic masses or melts or in the form of spinning solutions.

The pigment compositions of the invention are of particular interest however for the colouration of lacquers, paints and printing inks, especially solvent-based decorative and industrial paints and packaging inks.

The pigment compositions of the invention are characterised by redness of shade, excellent strengh, flow and solvent stability.

The following Examples further illustrate the present invention. Parts and percentages shown therein are by weight.

EXAMPLE 1

180.6 Parts phthalic anhydride, 42.9 parts anhydrous cupric chloride, 331.2 parts urea, 1.3 parts molybdic oxide, 150 parts nitrobenzene and 17.8 parts of the compound of average formula (II)

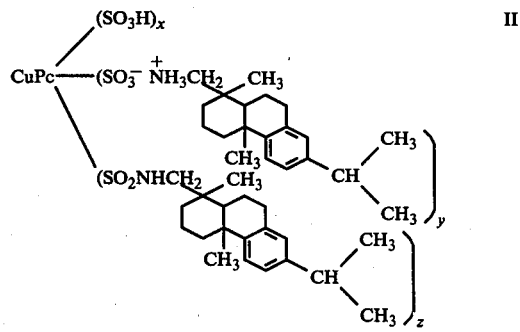

wherein x = 0.5 and y + z = 2, were stirred together in a vessel fitted with an air condenser. With stirring, the temperature was raised to 170° C over 4 hours with a slow heating stage of 1½ hours between 95° C and 110° C to allow the smooth evolution of volatile material.

The temperature was maintained at 170° C with stirring for 15 hours, after which the reaction mixture was discharged into a second vessel containing 35 parts of potassium hydroxide in 235 parts water. The nitrobenzene was removed by steam distillation and the residue filtered hot, and washed with hot water.

The presscake so obtained was reslurried in a solution of 100 parts concentrated hydrochloric acid in 500 parts water, stirred for 2 hours at 90° C, then filtered hot, washed acid-free with hot water and dried in an oven at 55° C.

Figure 2:
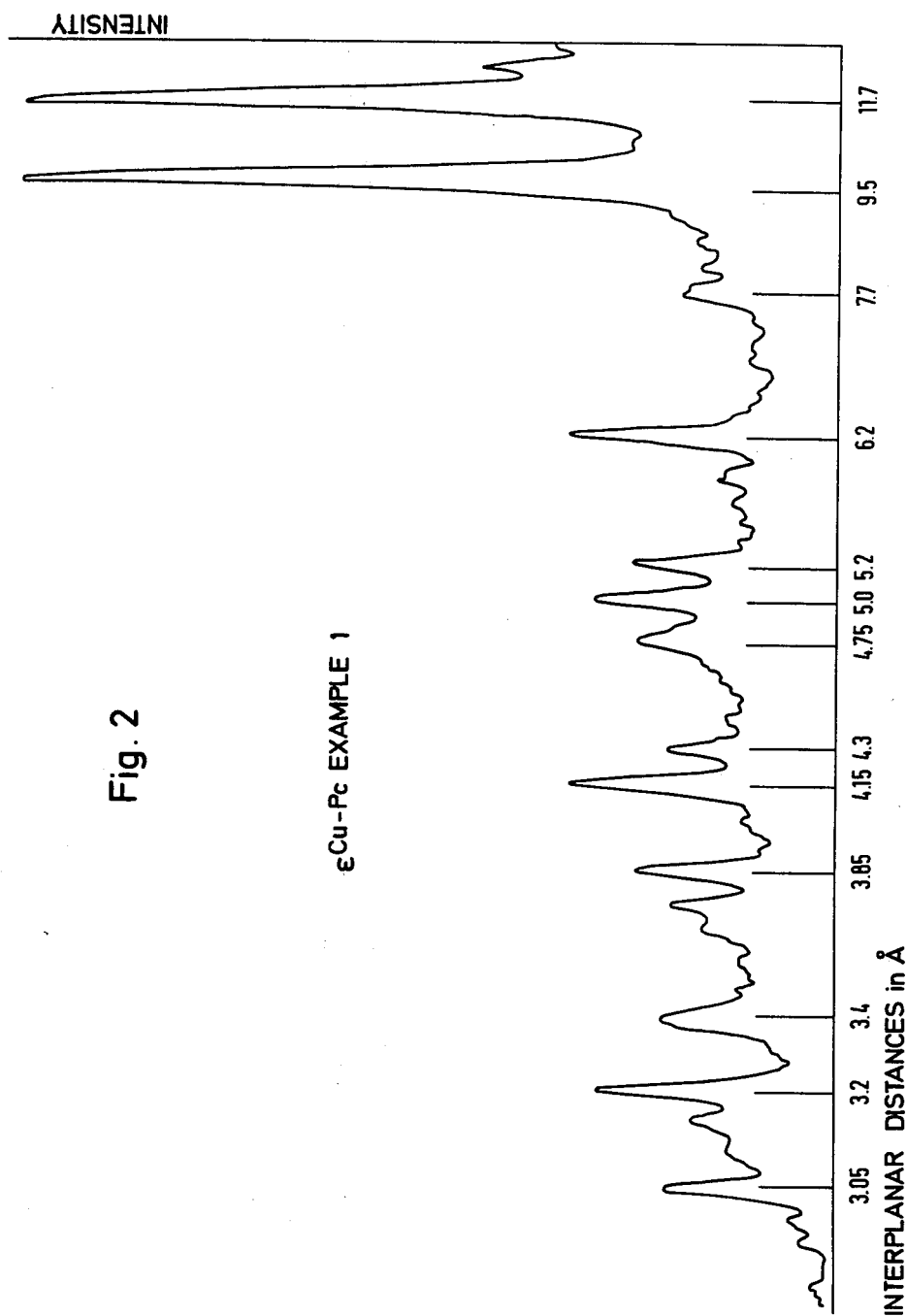

There were obtained 176 parts of a pigment composition having an x-ray diffraction spectrum (FIG. 2) corresponding to that characterizing the ε-modification.

The pigment composition was conditioned by grinding for 30 minutes in a ball mill, without a change of crystal modification, and subsequently incorporated in a thermosetting acrylic metallic paint (equal parts pigment compostion and aluminium flake) by ballmilling. When sprayed on to a metal panel, the paint film displayed a marked 'flip-tone' : that is to say an apparent change of shade from red to green dependent on the angle at which the paint film is viewed.

The crystals modification of the pigment composition of this Example was unchanged by reflux for 2 hours in 50 times its own weight of toluene.

If the synthesis stage of this Example is repeated in the absence of the compound of formula II, a copper phthalocyanine of the β-modification, having a particle size of 50–60 μ, is obtained.

EXAMPLE 2

The method of Example 1 was repeated with the replacement of the compound of formula II by an equal weight of the compound of formula

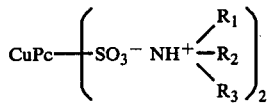

III wherein $R_1$ is a methyl group and $R_2$ and $R_3$ are each hydrogenated tallow residues.

Preparation of the Compound of Formula III

20 Parts of the compound of formula $CuPc(SO_3H)_2$ in presscake form, were stirred in 200 parts of isopropane and the temperature raised to reflux. 29.2 parts of the amine of formula

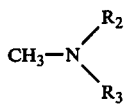

wherein $R_2$ and $R_3$ are each hydrogenated tallow residue, were dissolved in 200 parts hot isopropanol, and added over 5 minutes. After a further 30 minutes at reflux, 400 parts of water were added over 60 minutes, and the isopropanol simultaneously distilled off at the same rate. Stirring was stopped and the blue-green product of the reaction isolated by filtration from clear liquors, washed with warm water, and dried at 60° C, to give yield of 48.1 parts.

There were obtained 175 parts of a soft-textured, red-shade blue pigment composition, established as being in the ε-crystal modification by the similarity of its x-ray diffraction spectrum to that of Example 1.

When conditioned by grinding by the method of Example 1, the product of this Example displayed a marked strength advantage and redness of hue in an alkyd melamine industrial paint system, relative to a copper phthalocyanine pigment of the α-crystal form.

EXAMPLE 3

The method of Example 1 was repeated with the replacement of formula II by 15 parts of the compound of formula

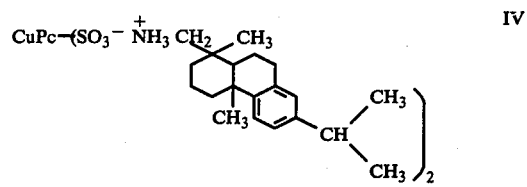

IV prepared by treating copper phthalocyanine disulphonic acid with commercial dehydroabietylamine.

Figure 3:
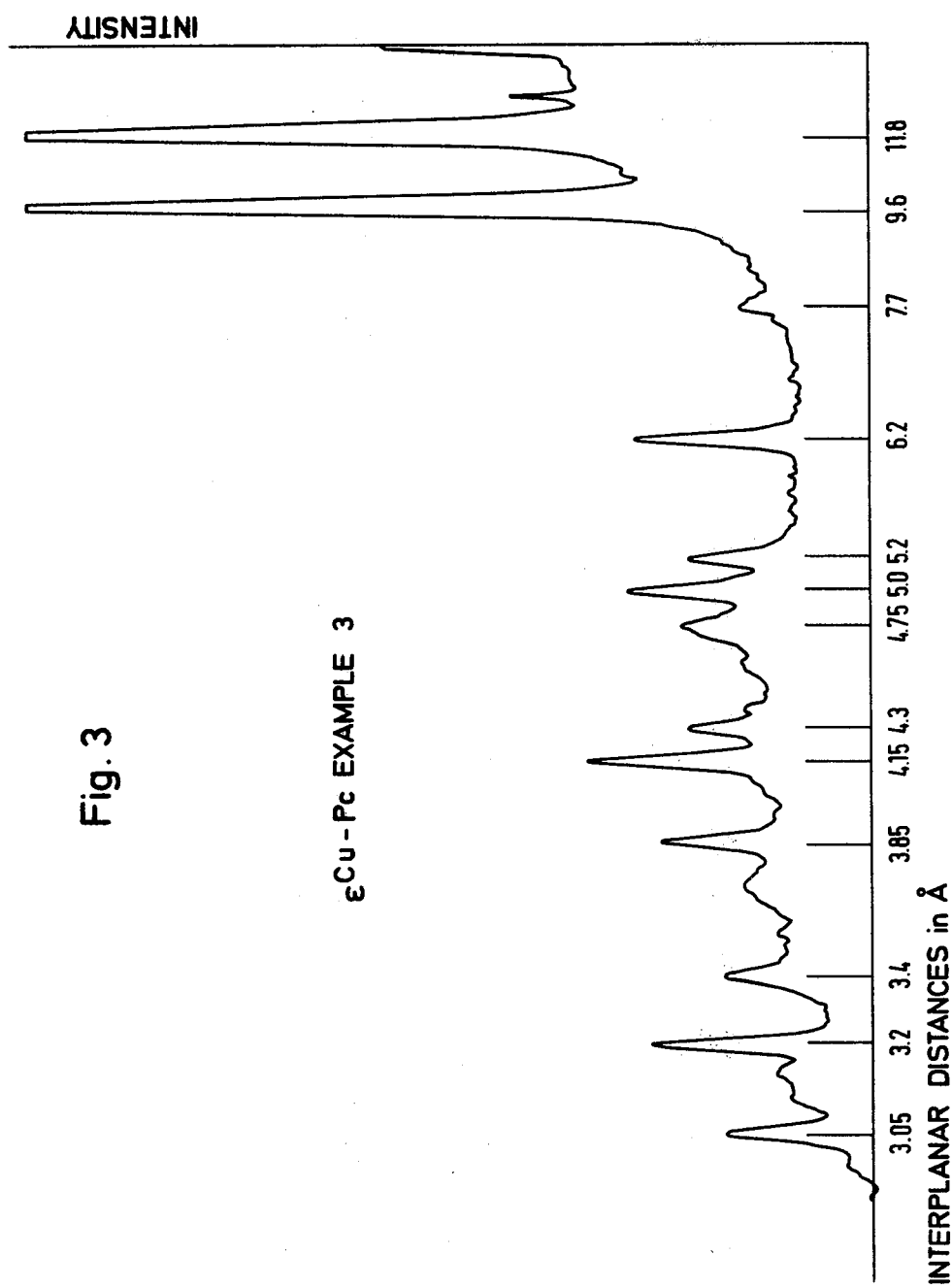

There were obtained 171 parts of soft textured, red-shade blue pigment composition, having the x-ray diffraction spectrum characteristic of the ε-form shown in FIG. 3.

The application properties of the product of this Example, when ground by the method of Example 1, were similar to those of Example 1. Alternatively, similar applicational properties may be obtained from the product of this example after conditioning by milling for up to six hours at reflux, in four times its weight of ethanol and eight times its weight of one mm. diameter glass beads. No change of crystal form is iduced by this treatment.

EXAMPLE 4

The method of Example 1 was repeated with the substitution of the compound of formula II by 15 parts of the compound of formula

$CuPc—(SO_3H)_2$     V

Figure 4:
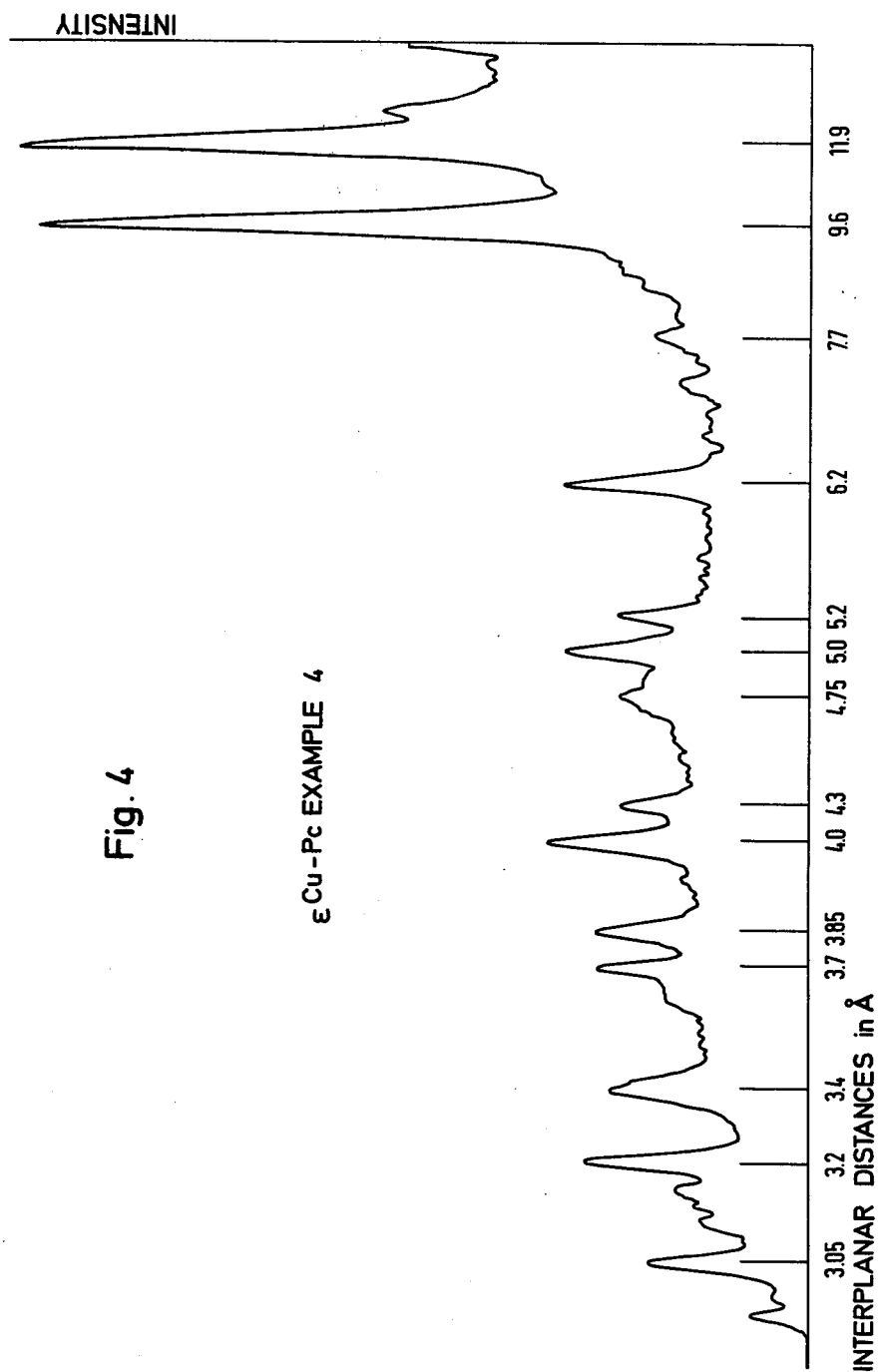

There were obtained 169 parts of a pigment composition identified by its x-ray diffraction spectrum (FIG. 4) as being in the ε-form.

EXAMPLE 5

90.3 Parts phthalic anhydride, 21.5 parts anhydrous cupric chloride, 165.6 parts urea, 0.65 parts molybdic oxide, 180 parts nitrobenzene and 8.9 parts of the compound of average formula

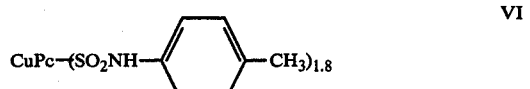

VI prepared by the reaction of a copper phthalocyanine sulphonyl chloride with p-toluidine, were stirred together, reacted, recovered and purified by the method of Example 1. There were obtained 92.7 parts of a pigment composition having an X-ray diffraction spectrum corresponding closely to that of Example 4.

EXAMPLE 6

Example 5 was repeated with the use of 8.9 parts of the compound of average formula

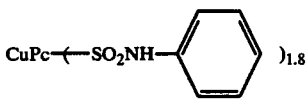

VII

Similar results were obtained.

EXAMPLE 7

90.3 Parts phthalic anhydride, 21.5 parts anhydrous cupric chloride, 165.6 parts urea, 0.65 parts molybdic oxide, 170 parts nitrobenzene and 8.5 parts of the compound of average formula:

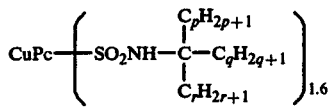

wherein the sum of p + q + r is from 17 to 21 prepared by reacting a copper phthalocyanine sulphonyl chloride with the commercially available mixture of substantially branched chain primary amines known as Primene JM-T (Rohm and Hass) were stirred together, reacted, recovered and purified by the method of Example I. There were obtained 91.5 parts of a pigment composition having an X-ray diffraction spectrum (FIG. 5) corresponding to the ε-modification of copper phthalocyanine.

EXAMPLE 8

The method of Example 7 was repeated with the use of 8.5 parts of the compound of formula

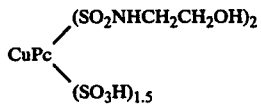

IX

Figure 5:
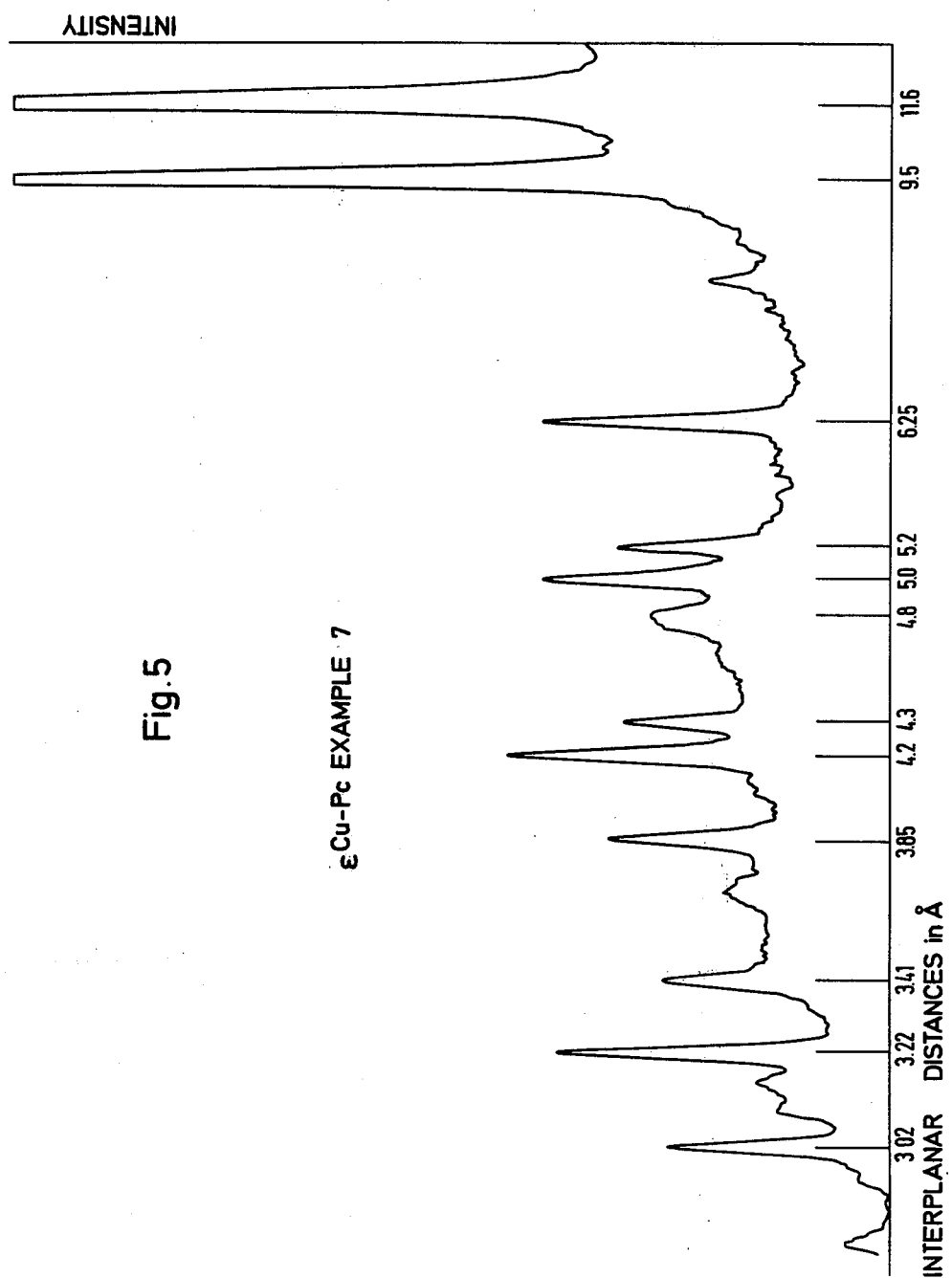

There were obtained 89.4 parts of a pigment composition having an X-ray diffraction spectrum similar to that shown in FIG. 5.

EXAMPLE 9

90.3 Parts phthalic anhydride, 21.5 parts anhydrous cupric chloride, 165.6 parts urea, 0.65 molybdic oxide, 140 parts nitrobenzene and 8.9 parts of the compound of average formula:

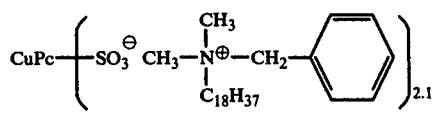

X were stirred together in a vessel fitted with an air condenser. With stirring, the temperature was raised to 175° C over 4 hours, with a slow heating stage of 1½ hours between 95° C and 110° C to allow the smooth evolution of volatile material.

The temperature was maintained at 170° C, with stirring for 14 hours, after which the reaction mixture was discharged into a second vessel containing 17.5 parts of potassium hydroxide in 200 parts water. The nitrobenzene was removed by steam distillation and the residue filtered hot, and washed with hot water.

The presscake so obtained was reslurried in a solution of 50 parts concentrated hydrochloric acid in 200 parts water, stirred for 2 hours at 90° C, then filtered hot, washed acid free with hot water, and dried in an oven at 50–60° C.

There were obtained 88 parts of a pigment composition having an X-ray diffraction spectrum (FIG. 6) corresponding to that characterising the ε-modification, and an average particle size, calculated from electron micrographs of 0.3–0.9.

The product of this Example was refluxed for 2 hours in fifty times its own weight of toluene, and recovered by filtration, washing with toluene, and drying at 50° C. No change in crystal modification or particle size could be detected as a result of such treatment. The product thus treated gave a strong, clean red shade in an alkyd-melamine industrial paint finish relative to an α-form copper phthalocyanine stabilised by the presence of chlorine in the molecule.

EXAMPLE 10

90.3 Parts phthalic anhydride, 165.6 parts urea, 21.4 parts anhydrous cupric chloride, 0.65 parts molybdic oxide, 177 parts nitrobenzene and 9.5 parts of the compound of formula IV were reacted together by the method of Example 1. The reaction mixture was allowed to cool, discharged into 1000 parts methanol, heated with stirring to the boil, and filtered from brownish green liquors. The presscake was reslurried in 500 parts hot methanol, stirred for 30 minutes, filtered at the boil and washed with hot methanol until the liquors became clear. After drying at 50° C, there were obtained 91.1 parts of a pigment composition having an X-ray spectrum similar to that shown in FIG. 6.

EXAMPLE 11

90 Parts phthalic anhydride, 18 parts anhydrous cuprous chloride, 0.5 parts molybdic oxide, 150 parts nitrobenzene, 10.8 parts of the compound of formula II and 165 parts urea were heated to 150° C over 4½ hours.

The temperature was held at 150° C for 3 hours, then raised to 170° C and maintained for a further 12 hours. Nitrobenzene was removed by steam distillation in 190 parts water and 35 parts of 50 % aqueous potassium hydroxide solution. The product was purified by stirring for 2 hours in 50 parts concentrated hydrochloric acid in 200 parts water at 95° C, filtering and washing with hot water, and drying at 55° C.

There were obtained 90.4 parts of a pigment composition having an X-ray spectrum corresponding to that shown in FIG. 3.

EXAMPLE 12

89.7 Parts phthalimide, 166 parts urea, 21.5 parts anhydrous cupric chloride, 0.65 ammonium molybdate, 13.3 parts of the compound of formula IV and 200 parts nitrobenzene were raised to 150° C at 100°/min. with stirring and maintained for 1½ hours. The temperature was then raised to 175° C and maintained for a further 10 hours.

Figure 6:
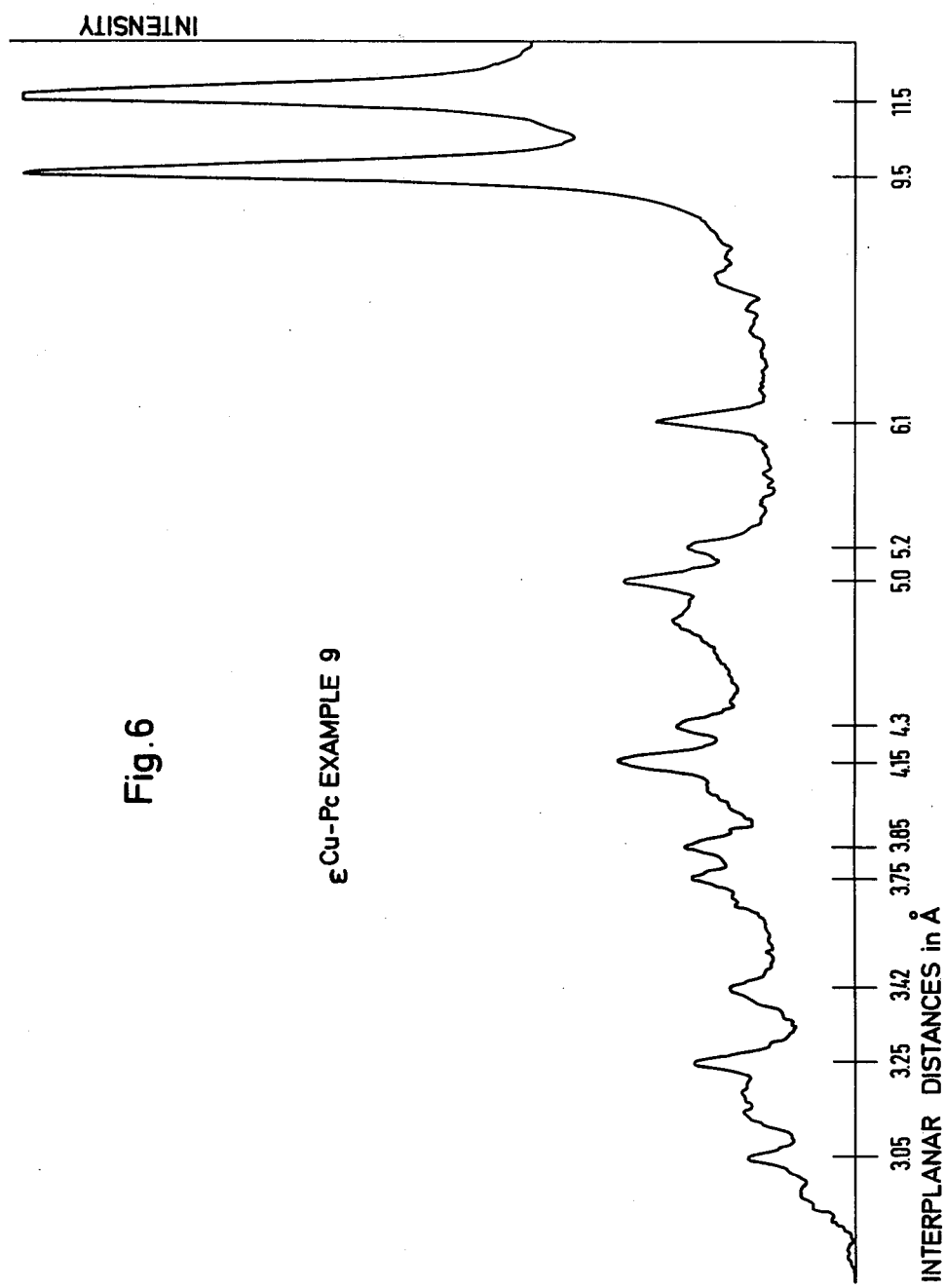

Using the recovery and purification methods of Example 11, there were obtained 92.9 parts of a pigment composition having an X-ray spectrum corresponding to that shown in FIG. 6.

EXAMPLE 13

The method of Example 1 was repeated except that the reaction was carried out at 200° C for 4 hours, and the product recovered by filtration of the reaction mixture and washing with 2500 parts hot methanol. The presscake was reslurried in 1500 parts hot methanol, stirred 1 hour, filtered, and washed with hot methanol until the liquors became clear. There were obtained 171 parts of a pigment composition of similar X-ray spectrum to that shown for Example 1 in FIG. 2.

EXAMPLE 14

The method of Example 9 was repeated with the substitution of the compound of formula X by the compound of average formula $$CuPc\left(-SO_3^- \; CH_3 \overset{+}{-} \underset{CH_3}{\overset{CH_3}{\underset{|}{N}}} - R_1\right)_2 \quad XI$$

wherein $R_1$ is a coconut oil residue.

The pigment composition recovered in a yield of 88.9 parts, had an X-ray spectrum similar to that of FIG. 6.

EXAMPLE 15

Example 9 was repeated with a reduced anhydrous cupric chloride level of 18.4 parts. There were obtained 82.9 parts of a pigment composition having an X-ray spectrum very similar to that of the product of Example 9.

Without further conditioning, the product of this example performed well when dispersed in PVC and in a litho ink medium.

EXAMPLES 16 AND 17

Example 9 was repeated using 0,325 and 1.3 parts of molybdic oxide respectively. Similar results were obtained. In particular, the X-ray diffraction spectra similar to that shown in FIG. 6.

EXAMPLE 18

Example 9 was repeated using 0.8 part of molybdic acid as catalyst. There were obtained 86.7 parts of a pigment composition having an X-ray diffraction spectrum similar to that shown in FIG. 6.

What is claimed is:

1. A single stage process for the production of copper phthalocyanine pigment compositions having x-ray diffraction spectra corresponding to the form of pure, or substantially pure ε-crystal modification of copper phthalocyanine comprising reacting, at an elevated temperature and in an organic solvent, an organic compound capable of forming the phthalocyanine ring system, a copper compound capable of providing the copper atom of the phthalocyanine molecule, a reaction catalyst, and a nitrogen source, in the presence of, as crystal form modifier, a compound of the formula $$Pc \underset{\diagdown (SO_2NR_5R_6)_z}{\overset{\diagup (SO_3M)_x}{-(SO_3^- \overset{+}{N}R_1R_2R_3R_4)_y}} \quad I$$

wherein Pc represents a copper residue, $R_1$, $R_2$, $R_3$, $R_4$ and $R_5$ and $R_6$ are the same or different and each is a hydrogen atom, an alkyl group, a cycloalkyl group, an aryl, aralkyl, alkaryl, cycloalkaryl or dehydroabietyl group, the alkyl and cycloalkyl groups being optionally unsaturated and/or interrupted by heteroatoms, M represents hydrogen or an alkali metal atom and x, y and z are each in the range of from 0 to 4 with the proviso that the sum of x, y and z is within the range of from 1 to 4.

2. A process for the single stage production of copper phthalocyanine pigment compositions having x-ray diffraction spectra corresponding to the form of pure, or substantially pure ε-crystal modification of copper phthalocyanine, comprising reaction at an elevated temperature and in an organic solvent, an organic compound capable of forming the phthalocyanine ring system, a copper compound capable of providing the copper atom of the phthalocyanine molecule, a reaction catalyst and a nitrogen source, in the presence of, as crystal form modifier, a compound of the formula:

$$CuPc \underset{\diagdown (SO_2NR_4'R_5')_{z'}}{\overset{\diagup (SO_3M)_{x'}}{-(SO^- \overset{+}{N}H \; R_1' \; R_2' \; R_3')_{y'}}} \quad IA$$

wherein CuPc represents a copper phthalocyanine residue, $R_1'$, $R_2'$, $R_3'$, $R_4'$ and $R_5'$ are the same or different and each represents a hydrogen atom, an acyclic alkyl group having from 1 to 22 carbon atoms or a cyclic alkyl group having from 5 to 22 carbon atoms, an aryl, aralkyl or dehydroabietyl group, M represents hydrogen or an alkali metal atom and x', Y' and z' can each be 0 or a value in the range of from 1 to 4, with the provisos that the sum of x', y' and z' is within the range of from 1 to 4 and that the sum of x' and y' is not zero.

3. A process as claimed in claim 1 wherein the compound of formula I is such that x has a value in the range of from 0 to 2 and z and y each have a value in the range of 0 to 3, provided that the sum of x, y and z is within the range of from 1 to 4.

4. A process as claimed in claim 1 wherein the crystal modifying additive is a compound of formula $$CuPc \underset{\diagdown (SO_2NHCH_2\cdots)}{\overset{\diagup (SO_3H)_x}{-(SO_3^- \overset{+}{N}H_3-CH_2\cdots)}}$$

wherein x = 0,5 and y + z = 2.

5. A process as claimed in claim 1 wherein the crystal modifying additive is a compound of formula $$CuPc\left(-SO_3^- \overset{+}{N}HR_1R_2R_3\right)_2$$

wherein $R_1$ is a methyl group and $R_2$ and $R_3$ are each hydrogenated tallow residues.

6. A process as claimed in claim 1 wherein the crystal modifying additive is a compound of formula

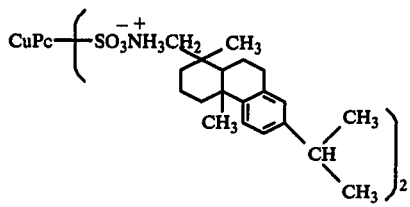

7. A process as claimed in claim 1 wherein urea is the source of nitrogen.

8. A process as claimed in claim 1 wherein the catalyst is a compound of molybdenum.

9. A process as claimed in claim 1 wherein the solvent boils at a temperature above 150° C.

10. A process as claimed in claim 9, wherein the solvent is nitrobenzene.

11. A process as claimed in claim 1 wherein the ε-form copper phthalocyanine product is subjected to a short milling cycle in a solvent, to other solvent treatment or to the addition of rosin or an aliphatic amine having from 12 to 22 carbon atoms.

12. A composition comprising an organic material and a pigmenting proportion of a pigment composition produced according to the process of claim 1.

* * * * *